United States Patent
Endres et al.

(10) Patent No.: US 8,778,834 B2
(45) Date of Patent: Jul. 15, 2014

(54) CARD-SHAPED DATA CARRIER

(75) Inventors: Günter Endres, München (DE); Tobias Salzer, Unterhaching (DE)

(73) Assignee: Giesecke & Devrient GmbH, Munich (DE)

( * ) Notice: Subject to any disclaimer, the term of this patent is extended or adjusted under 35 U.S.C. 154(b) by 75 days.

(21) Appl. No.: 13/509,121

(22) PCT Filed: Nov. 9, 2010

(86) PCT No.: PCT/EP2010/006820
§ 371 (c)(1),
(2), (4) Date: May 10, 2012

(87) PCT Pub. No.: WO2011/057760
PCT Pub. Date: May 19, 2011

(65) Prior Publication Data
US 2012/0263893 A1    Oct. 18, 2012

(30) Foreign Application Priority Data
Nov. 11, 2009 (DE) .......................... 10 2009 052 749

(51) Int. Cl.
*B41M 5/42* (2006.01)
*B44F 1/10* (2006.01)

(52) U.S. Cl.
CPC .. *B41M 5/42* (2013.01); *B44F 1/10* (2013.01); *B42D 2035/22* (2013.01); *B42D 2035/28* (2013.01)
USPC ............. 503/200; 503/204; 503/206; 428/29; 283/86; 430/8

(58) Field of Classification Search
CPC ........ B41M 5/42; B44F 1/10; B42D 2035/22; B42D 2035/28
USPC ............ 503/200–226; 428/29; 283/86; 430/8
See application file for complete search history.

(56) References Cited

U.S. PATENT DOCUMENTS

| 5,304,789 | A  | 4/1994  | Lob et al. |
| 7,252,239 | B2 | 8/2007  | Braun |
| 7,316,422 | B1 | 1/2008  | Schmitz |
| 2007/0085337 | A1 | 4/2007 | Endres et al. |
| 2008/0290649 | A1 | 11/2008 | Klein et al. |

FOREIGN PATENT DOCUMENTS

| DE | 4033300 A1 | 4/1992 |
| DE | 19941295 A1 | 3/2001 |
| DE | 102005057474 A1 | 5/2007 |
| WO | 0162509 A1 | 8/2001 |
| WO | 2005053968 A1 | 6/2005 |

OTHER PUBLICATIONS

IPRP & Written Opinion for PCT/EP2010/006820, issued May 15, 2012 (5 pages).
International Search Report for PCT/EP2010/006820, Mar. 7, 2011.

*Primary Examiner* — Bruce H Hess
(74) *Attorney, Agent, or Firm* — Workman Nydegger

(57) ABSTRACT

A multi-layer card-shaped data carrier has a marking layer containing a hidden marking, and a thermochromic cover layer arranged over the marking layer at least in the area of the hidden marking. The thermochromic cover layer is opaque below its change temperature, hides the marking, and is translucent or transparent above its change temperature, enabling viewing of the marking. The thermochromic cover layer is pervious to radiation outside the visible spectral range and the marking layer absorbs radiation energy outside the visible spectral range, so that the hidden marking can be incorporated into the marking layer through the thermochromic cover layer by laser radiation of a wavelength outside the visible spectral range.

13 Claims, 1 Drawing Sheet (a)          (b)

CARD-SHAPED DATA CARRIER

BACKGROUND OF THE INVENTION

A. Field of the Invention

The invention relates to multi-layer card-shaped data carriers, in particular card-shaped data carriers which are individualized with a laser scriber. The invention also relates to a method for incorporating a hidden marking into such a data carrier.

B. Related Art

Identity cards, such as for example credit cards or personal identity cards for a long time have been personalized by means of laser engraving and, upon doing so, provided for example with a passport photograph or other personal data. For personalizing an identity card by laser engraving as a rule the optical properties of the substrate material of the card are irreversibly changed, in particular blackened, through suitable guiding of a laser beam in the shape of a desired marking.

From the document DE 40 33 300 A1 it is known to provide a card-shaped data carrier, using a laser scriber, with an individualizing information item that is visually not visible, but that can be read out by machine using an infrared checking device. The individualizing information for this purpose is written through a camouflage layer that is black in the visible spectral range, but pervious to infrared radiation into a layer disposed underneath. The reading of the hidden information here in principle requires a corresponding reading device, since the black camouflage layer is pervious only to infrared radiation.

Proceeding from this it is the object of the invention to specify a data carrier of the type mentioned at the outset, that avoids the disadvantages of the prior art and that in particular makes possible a check of a hidden laser marking without using an additional reading device.

BRIEF SUMMARY OF THE DISCLOSURE

According to the invention a generic card-shaped data carrier comprises a marking layer containing a hidden marking, as well as a thermochromic cover layer arranged over the marking layer at least in the area of the hidden marking. The thermochromic cover layer is opaque below its change temperature and hides the marking, whereas it is translucent or transparent above its change temperature, allowing the viewing of the marking. According to the invention the thermochromic cover layer is pervious to radiation outside the visible spectral range and the marking layer absorbs radiation energy outside the visible spectral range, so that the hidden marking can be incorporated into the marking layer through the thermochromic cover layer by means of laser radiation of a wavelength outside the visible spectral range.

The invention thus connects a simple, interactive verifiability of the data carrier through temperature loading with the option of subsequent individualization by laser marking of an inside layer of the data carrier.

In advantageous embodiments the thermochromic cover layer is formed by a thermochromic printed layer or by a thermochromic foil element. Preferably the thermochromic cover layer has a change temperature in the range of 25° C. to 60° C., particularly preferably in the range of 30° C. to 40° C.

For further authenticity protection and/or for optical enhancement further layers can be arranged over the thermochromic cover layer, for example an optically variable color layer, in particular on the basis of liquid crystal pigments. Also a transparent foil with a diffractive diffraction structure, in particular a hologram or another hologram-like diffraction structure comes into consideration. The further layer here merely must be pervious to the radiation of the used laser scriber in the area of the hidden marking to be incorporated, a condition that is fulfilled in the infrared spectral range for many optically variable pigments and for transparent hologram foils with dielectric coatings.

In an advantageous embodiment the thermochromic cover layer is of reliefed configuration. The relief can for example be produced using laminating plates or the like. For stabilizing the surface the relief can be provided with a lacquer.

According to a further embodiment the relief is produced by printing technology. For this purpose color layers that contain thermochromic pigments are applied partially in one or several printing processes. The printed areas form elevations and together with the unprinted areas produce the desired relief.

According to a further variant of the invention the thermochromic cover layer is configured at least in partial areas in the form of patterns, characters or a coding.

The thermochromic cover layer according to a further development of the invention contains two or several thermochromic partial layers arranged over each other, so that at least a first and a second thermochromic partial layer arranged over each other is present. Through different properties and/or embodiment of the thermochromic partial layers here attractive visual design variants or additional authenticity protection of the data carrier are possible.

In a particularly advantageous variant of the invention the first thermochromic partial layer is of planar configuration and the second thermochromic partial layer is of reliefed configuration. Through this type of embodiment the relief stands out particularly plastically.

Alternatively or additionally the first and the second thermochromic partial layer can have different colors below their change temperature and/or can have different change temperatures. At least one of the thermochromic partial layers can also be configured in the form of patterns, characters or a coding.

For example a first, full-surface, thermochromic partial layer with a first color and a first, lower change temperature can be applied over a second, structured, thermochromic partial layer with a second color and a second, higher change temperature. The second thermochromic partial layer here is structured in the form of a motif, for example of a graphic pattern or a sequence of characters.

Below the first change temperature only the full-surface first partial layer in the first color is recognizable upon viewing, possibly together with an optically variable layer arranged still on top. At temperatures between the first and the second change temperature the first partial layer is transparent, whereas the second, structured partial layer is still opaque, so that now the motif of the second partial layer is visible. Depending on the arrangement and form of the motif here also the hidden marking disposed underneath can be completely or partly visible. Above the second change temperature both partial layers are transparent and the viewer now sees the previously hidden marking completely. In this fashion a sequence of different optical effects can be produced by temperature loading.

The first and second thermochromic partial layer can be arranged spaced apart from each other, in particular separated by a foil element, or they can be arranged immediately over each other.

The invention also contains a method for incorporating a hidden marking into a card-shaped data carrier having a marking layer that absorbs radiation energy outside the visible spectral range, and over which there is arranged, in an area to be marked, a thermochromic cover layer that is pervious to radiation outside the visible spectral range. In the method the hidden marking is incorporated into the marking layer through the thermochromic cover layer according to the invention through the effect of laser radiation of a wavelength outside the visible spectral range.

In an advantageous variant of the method for incorporating the marking laser radiation in the infrared spectral range is used.

BRIEF DESCRIPTION OF THE DRAWINGS

Further embodiment examples as well as advantages of the invention will be explained hereinafter with reference to the figures. For greater clarity, the figures do without a representation that is true to scale or true to proportion.

The figures are described as follows.

DETAILED DESCRIPTION OF PREFERRED EMBODIMENTS OF THE INVENTION

Figure 1:
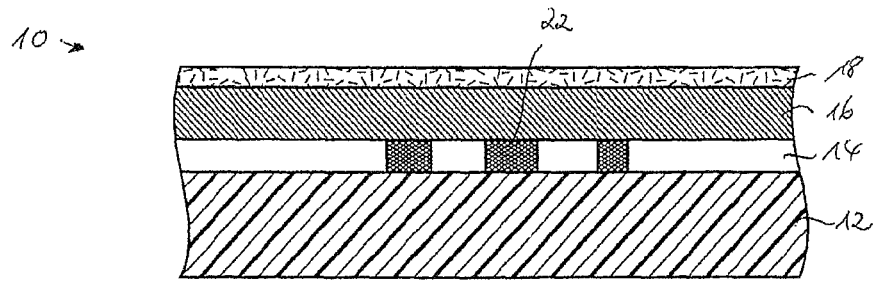
FIG. 1 a cross section through a card-shaped data carrier according to the invention in the area of the hidden marking, FIG. 2 respectively a plan view of the data carrier of FIG. 1 in (a) below and in (b) above the change temperature of the thermochromic cover layer, and FIG. 3 a cross section through a card-shaped data carrier according to a further embodiment example of the invention.
Figure 2:
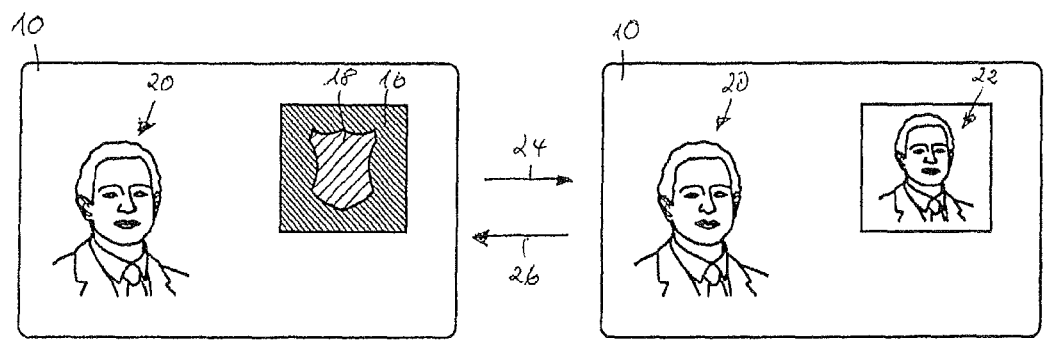

The invention will now be explained with reference to an identification card. FIG. 1 for this purpose shows a cross section through an identification card 10, such as for example an identity card, bank card, credit card or a driver's license. Regarding the structure of the card, only the layers which are essential for the invention are shown. It is understood that the identification card, depending on the intended use, in addition typically contains further layers that are known per se to the person skilled in the art. FIG. 2 shows two plan views of the identification card 10 of FIG. 1, one at a normal ambient temperature of around 20° C. (FIG. 2(a)), and one at a temperature of around 40° C. that is raised for carrying out the authenticity check (FIG. 2(b)).

With reference to FIG. 1 the identification card 10 comprises a card base body 12, which, depending on the area of employment of the card, generally consists itself of several laminated foils, as well as a marking layer 14 and a thermochromic cover layer 16 with a change temperature of 35° C. Below the change temperature, thus also at normal ambient temperature, the thermochromic cover layer is opaque, for example black, whereas above its change temperature it is translucent or transparent and allows the viewing of the layers disposed below. Over the thermochromic cover layer 16 optionally further layers are arranged, such as for example a structured, optically variable liquid crystal layer 18.

In a first area the identification card 10 has an open marking 20, for example a portrait of the card holder, as shown in FIG. 2(a) and (b). This open marking 20 is always visible independently of the ambient temperature. It can be incorporated into the card base body, in the marking layer or in another layer that is not shown in the cross section in FIG. 1.

In a second area of the identification card 10 the marking layer 14 additionally has a hidden marking 22, for example a portrait representation of the card holder that is scaled down in comparison to the marking 20, as illustrated in FIG. 2(b). This hidden marking 22 here was incorporated into the marking layer 14 through the thermochromic cover layer 16 after the manufacture of the card itself in the card manufacturer's works through the influence of infrared laser radiation, as described in greater detail below.

As illustrated in FIG. 2(a), the hidden marking 22 is not visible at normal ambient temperature (T<35° C.), since in this temperature range the thermochromic cover layer 16 disposed over the hidden marking 22 is opaque and hides the marking 22. At normal ambient temperature the second area of the identification card 10 consequently, when viewed, appears with the optically variable impression of the structured liquid crystal layer 18 that makes an effective appearance against the black background of the thermochromic cover layer 16.

When the temperature of the identification card 10 is raised above the change temperature of 35° C. (arrow 24), for example to a temperature of 40° C., the thermochromic cover layer 16 becomes transparent and allows the viewing of the previously hidden marking 22, as shown in FIG. 2(b). At the same time the optically variable effect of the liquid crystal layer 18 recedes due to the now missing dark background. Upon cooling (arrow 26) the original visual appearance of FIG. 2(a) is restored reversibly within a short time.

The hidden marking 22 thus permits an authenticity check of the identification card 10 that can be carried out with most simple means. Preferably the open marking 20 and the hidden marking 22 are related to each other, such as for example the two portrait representations of FIG. 2(b), so that the user can readily assess the authenticity of the card 10 on the basis of the match or a lack of match of the markings 20, 22 upon temperature loading of the card 10.

Besides the simple interactive verifiability a further particular advantage of the design according to the invention is that the hidden marking 22 can be integrated in the inside of the layer structure by a laser beam scriber, after the actual manufacture of the identification card 10 at the card manufacturer's plant, and can thereby be used for the subsequent, decentralized individualization of the card 10.

The thermochromic cover layer 16 can in particular be configured as a printed element or as a foil element. An additional protection can be achieved through the optional further layer 18 that can for example be a structured, optically variable liquid crystal layer 18 (FIGS. 1 and 2). The second layer 18 here merely must be pervious to the radiation of the used laser scriber in the area of the marking to be incorporated.

The thermochromic cover layer can also consist of several partial layers arranged over each other. The partial layers can for example be configured as thermochromic partial layers with different change temperatures and/or different colors. In this fashion, upon temperature loading, a cascade of different visual impressions can be produced. However, the partial layers can also have the same change temperature and/or the same colors.

Figure 3:
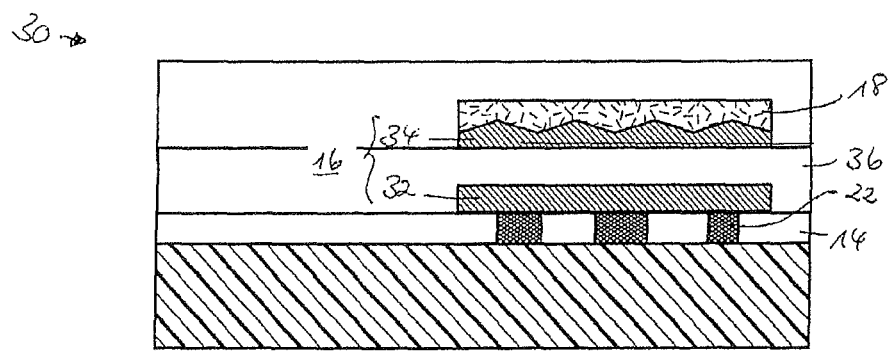

With reference to the cross section through the identification card 30 according to the invention of FIG. 3 the thermochromic cover layer 16 in a particularly preferred embodiment comprises a first thermochromic partial layer 32 and a second thermochromic partial layer 34, with the first thermochromic partial layer 32 being of planar configuration and the second thermochromic partial layer 34 being of reliefed configuration. The second thermochromic layer 34 here can in particular be configured as a relief with the aid of laminating plates or also by printing technology. In the embodiment example both thermochromic partial layers 32, 34 have a change temperature of 35° C. The two partial layers can, as shown in FIG. 3, be spaced apart through a foil element 36, in other embodiments the two partial layers 32, 34 can also be present directly over each other. The embodiment as at least two partial layers, of which at least one partial layer is provided with a relief, results in a three-dimensional effect with which the relief stands out against its environment.

Over the partial layer 34 of reliefed configuration there is arranged an optically variable liquid crystal layer 18 which, in the embodiment example, was applied to the second partial layer 34 in a thickness of 15 to 20 μm by a screen printing process. This layering starts out from an application of both partial layers 18 and 34 to the foil element 36. Of course the layering has to be inverted when the partial layers 18 and 34 are applied to the foil element 36.

Also in this embodiment the hidden marking 22 was incorporated into the marking layer 14 through the two thermochromic partial layers 32, 34 pervious to infrared radiation and the liquid crystal layer 18 pervious to infrared radiation through the effect of infrared laser radiation.

At normal ambient temperature, thus below the change temperature of the thermochromic partial layers 32, 34 these are opaque, so that the visual impression of the identification card 30 in the area of the hidden marking is determined by the relief of the partial layer 34 in interaction with the optically variable liquid crystal layer 18.

Above the change temperature, for example at a temperature of 40° C., both thermochromic partial layers 32, 34 are transparent and allow the viewing of the previously hidden marking 22.

In all designs the thermochromic cover layer 16 and the optional further layer are pervious to radiation outside the visible spectral range, in particular to infrared radiation, whereas the marking layer 14 absorbs radiation energy outside the visible spectral range, in particular infrared radiation. The hidden marking 22 can thus be inscribed into the marking layer 14 through the thermochromic cover layer 16 and the further layer 18 by means of laser radiation of a wavelength outside the visible spectral range, for example a wavelength of 1.064 μm (Nd:Y AG laser). This individualization can in particular take place after the actual manufacture of the card-shaped data carrier by the card manufacturer, for example when personal data identifying an authorized user of the data carrier are to be incorporated into the inside of the layer structure subsequently on the spot.

The marking layer 14 is sensitized for the radiation of the used laser scriber, so that the absorption of radiation energy leads to a visually recognizable change, for example a discoloration, bleaching or blackening. The marking layer 14 for this purpose can be sensitized for laser radiation in the near infrared for example by carbon black pigments, infrared absorbers on the basis of antimony/tin, or also by magnetic pigments, for example on the basis of iron oxides.

The invention claimed is:

1. A multi-layer card-shaped data carrier, comprising:
a marking layer containing a hidden marking,
a thermochromic cover layer which arranged over the marking layer at least in the area of the hidden marking, said cover layer being opaque below its change temperature, hiding the marking, and being translucent or transparent above its change temperature, enabling viewing of the marking,
said thermochromic cover layer being pervious to radiation outside the visible spectral range and the marking layer absorbing radiation energy outside the visible spectral range, so that application of the hidden marking into the marking layer through the thermochromic cover layer by laser radiation of a wavelength outside the visible spectral range is enabled,
wherein the thermochromic cover layer is of reliefed configuration.

2. The data carrier according to claim 1, wherein the thermochromic cover layercomprises a thermochromic printed layer.

3. The data carrier according to claim 1, wherein the thermochromic cover layer comprises a thermochromic foil element.

4. The data carrier according to claim 1, wherein the thermochromic cover layer has a change temperature in the range of 25° C. to 60° C.

5. The data carrier according to claim 1, wherein there is arranged over the thermochromic cover layer an optically variable color layer.

6. The data carrier according to claim 1, wherein the thermochromic cover layer comprises at least a first and a second thermochromic partial layer arranged over each other.

7. The data carrier according to claim 6, wherein the first and second thermochromic partial layer have different colors below their change temperature.

8. The data carrier according to claim 6, wherein the first and second thermochromic partial layer have different change temperatures.

9. The data carrier according to claim 6, wherein the first and second thermochromic partial layer arc arranged spaced apart from each other.

10. A multi-layer card-shaped data carrier, comprising:
a marking layer containing a hidden marking,
a thermochromic cover layer which arranged over the marking layer at least in the area of the hidden marking, said cover layer being opaque below its change temperature, hiding the marking, and being translucent or transparent above its change temperature, enabling viewing of the marking,
said thermochromic cover layer being pervious to radiation outside the visible spectral range and the marking layer absorbing radiation energy outside the visible spectral range, so that application of the hidden marking into the marking layer through the thermochromic cover layer by laser radiation of a wavelength outside the visible spectral range is enabled,
wherein there is arranged over the thermochromic cover layer a transparent foil with a diffractive diffraction structure.

11. A multi-layer card-shaped data carrier, comprising:
a marking layer containing a hidden marking,
a thermochromic cover layer which arranged over the marking layer at least in the area of the hidden marking, said cover layer being opaque below its change temperature, hiding the marking, and being translucent or transparent above its change temperature, enabling viewing of the marking,
said thermochromic cover layer being pervious to radiation outside the visible spectral range and the marking layer absorbing radiation energy outside the visible spectral range, so that application of the hidden marking into the marking layer through the thermochromic cover layer by laser radiation of a wavelength outside the visible spectral range is enabled,
wherein the thermochromic cover layer comprises at least a first and a second thermochromic partial layer arranged over each other, and
wherein the first thermochromic partial layer is of planar configuration and the second thermochromic partial layer is of reliefed configuration.

12. A method for incorporating a hidden marking into a card-shaped data carrier having a marking layer which absorbs radiation energy outside the visible spectral range, and over which in an area to be marked there is arranged a thermochromic cover layer that is pervious to radiation outside the visible spectral range, comprising the step:

applying the hidden marking into the marking layer through the thermochromic cover layer through the effect of laser radiation of a wavelength outside the visible spectral range, wherein the thermochromic cover layer is of reliefed configuration.

13. The method according to claim 12, including the steps of using laser radiation in the infrared spectral range for applying the marking of a wavelength of around 1.06 µm.

* * * * *